E. SCHNEIDER.
PRESSURE REDUCING APPARATUS FOR FLUIDS.
APPLICATION FILED FEB. 14, 1918.
1,267,281.
Patented May 21, 1918.
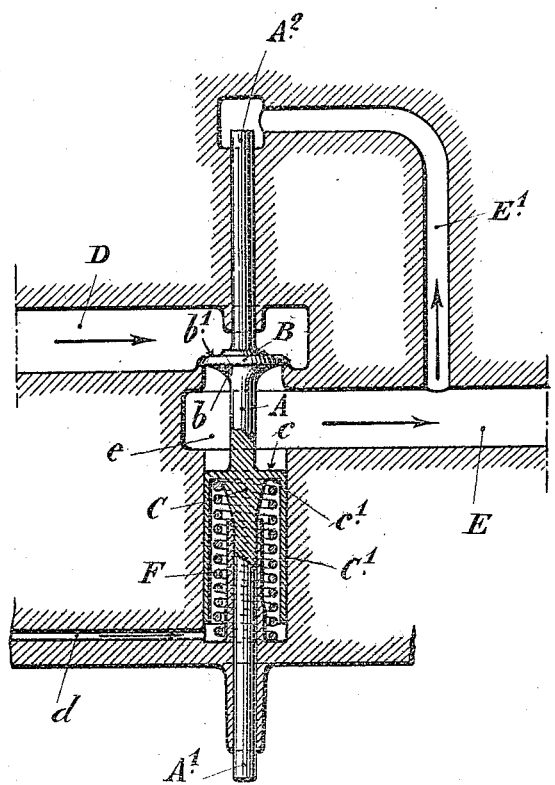

UNITED STATES PATENT OFFICE.

EUGÈNE SCHNEIDER, OF PARIS, FRANCE.

PRESSURE-REDUCING APPARATUS FOR FLUIDS.

1,267,281.

Specification of Letters Patent.   Patented May 21, 1918.

Application filed February 14, 1918. Serial No. 217,205.

*To all whom it may concern:*

Be it known that I, EUGÈNE SCHNEIDER, a citizen of the French Republic, and a resident of 42 Rue d'Anjou, Paris, France, have invented a new and useful Improvement in Pressure-Reducing Apparatus for Fluids, which invention is fully set forth in the following specification.

This invention has for its object to provide an improved pressure reducing device for fluids which is especially simple and practical.

The improved pressure reducing apparatus consists simply of a piston valve approximately balanced by the reduced pressure behind it and an opposing spring.

The improved apparatus according to the present invention comprises two disks of approximately equal diameters formed on the ends of a common stem which is suitably guided by means of extensions of the said stem. One of these disks serves as the main valve and the other serves as a piston. The mutually opposite faces of the two disks are subjected to the reduced fluid pressure, while the other faces of the said two disks are subjected to the action of the high pressure fluid. The free end of the stem extension projecting outwardly beyond the main valve disk, is exposed through a branch duct to the reduced fluid pressure, whereas the stem extension projecting outwardly beyond the piston disk is exposed to atmospheric pressure. A spring of adjustable tension is arranged to act upon the outer face of the piston; it is adjusted in such a manner as to become preponderant and to cause the opening of the main valve when the reduced fluid pressure acting upon that portion of the stem projecting on the side of the main valve, falls below a given value.

A practical form of this invention is illustrated by way of example in the accompanying drawing which is a sectional elevation of the improved apparatus.

As shown, the ends of a stem A are constructed with two disks B and C. The disk B constitutes the main valve and is adapted to shut off from the duct D communicating with the supply of high pressure fluid, the chamber $e$ and the duct E for the fluid at reduced pressure. The disk C is constructed as a piston working in a cylinder $C^1$. These disks B and C are of approximately equal diameters. Their mutually opposite faces $b$ and $c$ are subjected to the reduced fluid pressure, and their outer faces $b^1$, $c^1$ are subjected to the high fluid pressure. The cylinder $C^1$ communicates with the high pressure fluid by means of a duct $d$. The end $A^1$ of the extension of the stem projecting beyond the face $e^1$ of the piston C, extends into the atmosphere, whereas the end $A^2$ of the stem extends into a branch duct $E^1$ of the reduced fluid pressure duct E.

F is a spring located in the cylinder $C^1$ and acting upon the piston disk C. The tension of this spring is so adjusted that it balances the pressure acting upon the stem extension $A^2$ when the pressure in the chamber $e$ has attained a determined value. The tension of the said spring is preponderant so long as the pressure in the chamber $e$ is less than the said determined value. It will be perceived that the improved pressure reducing apparatus consists substantially of a single movable member that has a very sensitive balance of equilibrium, and comprises only one spring, while its movements for throttling the communication between the ducts D and E up to a point where the lift of the main valve D is such that the fluid will pass into the duct E at the desired pressure, are produced simply by the pressure of the fluid upon the end $A^2$ of the stem guiding the said member. On the whole the single member A—B—C is substantially in equilibrium under the action of the reduced pressure exerted at $A^2$ and of the opposing spring F.

What I claim is:—

In a fluid pressure reducing apparatus, the combination with a main high pressure fluid duct, and a main reduced pressure fluid duct, of a valve for controlling the flow of fluid between the two main ducts, a piston having its inner face exposed to said main reduced pressure duct, a stem connecting said valve and said piston, a branch high pressure fluid duct leading to the outer face of said piston, a balancing spring acting against the outer face of said piston, a branch reduced pressure fluid duct, a stem projecting from the outer face of said valve into said branch reduced pressure fluid duct, and a stem projecting from the outer face of said piston into the atmosphere, whereby the variations of the reduced fluid pressure acting upon the stem end projecting from said valve into said branch reduced pressure fluid duct will cause said valve to move more or less to one or the other side of its normal position of equilibrium determined by the adjustment of said balancing spring.

In testimony whereof I have signed this specification.

EUGÈNE SCHNEIDER.

Witnesses:
ANDRÉ MOSTICKER,
CHAS. P. PRESSLY.